(No Model.)

J. H. M. FORCK.
REVOLVING RAKE.

No. 316,954.  Patented May 5, 1885.

Witnesses:  Inventor:

UNITED STATES PATENT OFFICE.

JOSEPH HERMAN MATIAS FORCK, OF TAOS, MISSOURI.

REVOLVING RAKE.

SPECIFICATION forming part of Letters Patent No. 316,954, dated May 5, 1885.

Application filed May 22, 1884. (No model.)

*To all whom it may concern:*

Be it known that I, JOSEPH HERMAN MATIAS FORCK, a citizen of the United States, residing at Taos, in the county of Cole and State of Missouri, have invented certain new and useful Improvements in Revolving Rakes, of which the following is a specification, reference being had therein to the accompanying drawings.

My invention relates to that class of rakes especially adapted for use in raking together cornstalks, after the corn has been harvested, in order to burn them and leave the field clean for the next crop.

The object of my invention is to provide a rake for use, especially, in old corn-fields, where the land is very stumpy or stony, and at the same time be so simple in construction that it cannot get out of order, and so cheap of manufacture that it will come within the reach of all who need such a rake. All of these desirable objects I attain by attaching any ordinary "double-tree," "single-tree," or "neck-yoke" to a revolving axle provided with teeth, a simple attachment to govern said axle, and in doing away with wheels, springs, and gears.

Figure 1:
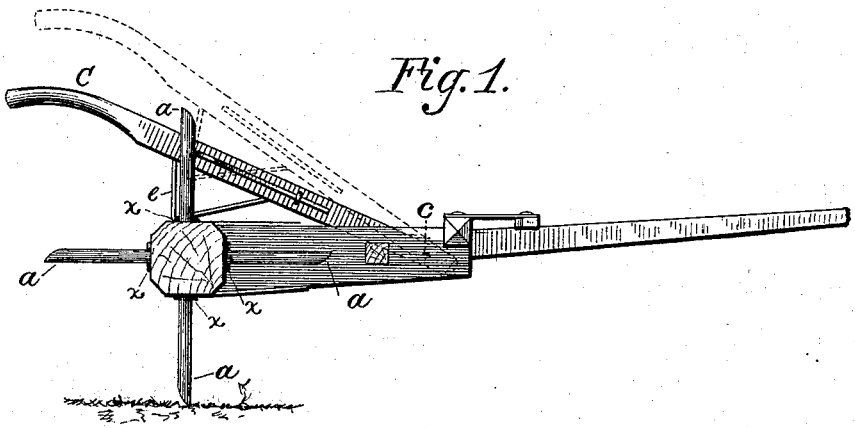
Figure 2:
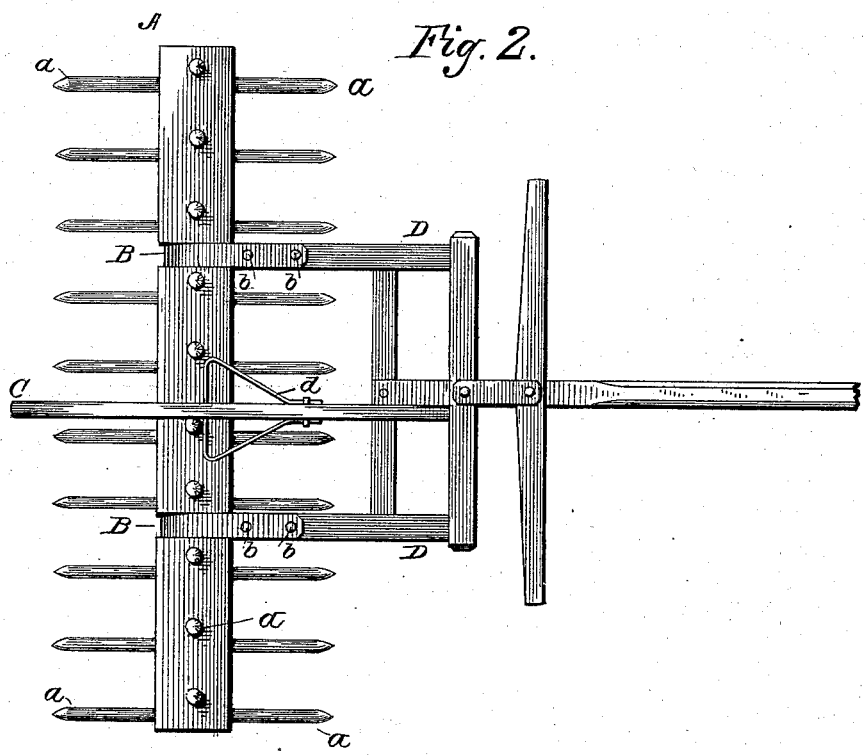

Figure 1 is a side elevation of my invention, and Fig. 2 a top view.

Similar letters refer to similar parts.

In the drawings, A represents a revolving axle, which may be made of wood or iron, provided with teeth $a$. An ordinary double-tree, D, is attached to axle A by means of metal straps B B, and rigidly secured to the double-tree by ordinary bolts, $b\ b\ b\ b$. A hand-lever, C, is loosely secured to the double-tree by a pin, $c$, Fig. 1, and is provided with a check or stop guard, $d$, to prevent the axle from revolving, thereby keeping the teeth in position while in use, and a standard, $e$, to hold the hand-lever at a convenient height.

I have preferably made the axle of a piece of square timber, simply chamfering the corners, and put iron bands around the ends to prevent splitting either by exposure to the weather or by driving the teeth too tight near the ends.

In attaching the teeth, which may be made of wood or other suitable material, I bore holes through the axle, and have the teeth of such a size that they will drive in the holes tightly. The holes may be slightly tapered at the edges, and wedges driven in to insure additional security; or pins may be driven in the teeth, as shown by $x\ x$. The axle A has two suitably-rounded bearings formed on it by cutting out the material at the desired points. Around said bearings straps of metal B B are loosely fitted and rigidly secured to the double-tree D by means of bolts $b\ b$. The straps are loosely fitted to the bearings for the purpose of allowing the axle to freely revolve at the will of the operator. The hand-lever C, being loosely secured to the double-tree D, can be easily lifted when required.

The check or stop guard $d$ is a piece of rod-iron shaped in the form of a triangle, which bears against the teeth and prevents the axle revolving when it is desired that it should remain in position while working, and is secured to the hand-lever by bolts or any other well-known means.

The standard $e$ is made of small rod-iron bent in a triangular shape, with the ends driven into the under part of the hand-lever to secure it in place; and it is made of sufficient length to hold the lever at a convenient height for use when resting on the axle A, as shown in Fig. 1.

When using my invention, the operator walks behind it with one hand on the lever C. When a sufficient quantity of cornstalks have been gathered, the lever is raised, as shown by dotted lines in Fig. 1, which allows the axle carrying the teeth to revolve and leave them in a heap. The lever is then lowered until the standard $e$ rests on the top of the axle A, when one or two teeth, as desired, of the next row come in contact with the check or stop guard $d$, which prevents the axle from revolving any further until the lever is again raised.

My invention is peculiarly adapted for use in fields where there are many stumps or large stones, inasmuch that in the course of operation, if it comes in contact with a stump or stone the lever is at once raised, the axle revolves and the teeth straddle over it. No stop is necessary, and no damage done to the rake.

Having thus fully described my invention, what I claim as new, and desire to secure by Letters Patent, is—

In a revolving rake, in combination with a suitable frame, the revolving axle A, provided with four rows of teeth, $a\ a\ a\ a$, the bearings with loosely-fitted metal straps B B, rigidly attached to said frame D, the hand-lever C, with check or stop guard $d$, and standard $e$, substantially as described and specified, and for the purpose set forth.

In testimony whereof I have affixed my signature in presence of two witnesses.

JOSEPH HERMAN MATIAS FORCK.

Witnesses:
M. H. WALTERS,
JOHN H. SAMING.